(12) United States Patent
Solomonson et al.

(10) Patent No.: US 6,913,708 B2
(45) Date of Patent: Jul. 5, 2005

(54) CHOLESTERIC LIQUID CRYSTAL DRYING PROCESS AND SOLVENT

(75) Inventors: Steven D. Solomonson, Shoreview, MN (US); Marc D. Radcliffe, Newport, MN (US); Richard J. Pokorny, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/373,127

(22) Filed: Feb. 24, 2003

(65) Prior Publication Data

US 2004/0164274 A1 Aug. 26, 2004

(51) Int. Cl.⁷ .............................................. C09K 19/52
(52) U.S. Cl. .................. 252/299.01; 349/186; 427/162
(58) Field of Search ........................ 252/299.01–299.7; 349/182–192; 427/162, 164

(56) References Cited

U.S. PATENT DOCUMENTS

| | | | |
|---|---|---|---|
| 4,293,435 A | | 10/1981 | Portugall et al. |
| 4,412,059 A | * | 10/1983 | Krigbaum et al. .......... 528/192 |
| 4,974,941 A | | 12/1990 | Gibbons et al. |
| 5,032,009 A | | 7/1991 | Gibbons et al. |
| 5,332,522 A | | 7/1994 | Chen et al. |
| 5,389,698 A | | 2/1995 | Chigrinov et al. |
| 5,581,905 A | | 12/1996 | Huelsman et al. |
| 5,602,661 A | | 2/1997 | Schadt et al. |
| 5,691,789 A | | 11/1997 | Faris et al. |
| 5,694,701 A | | 12/1997 | Huelsman et al. |
| 5,709,817 A | | 1/1998 | Siemensmeyer et al. |
| 5,744,057 A | | 4/1998 | Meyer et al. |
| 5,759,449 A | * | 6/1998 | Shiro et al. ................ 252/582 |
| 5,780,629 A | | 7/1998 | Etzbach et al. |
| 5,834,112 A | * | 11/1998 | Muraoka et al. ............ 428/332 |
| 5,838,407 A | | 11/1998 | Chigrinov et al. |
| 5,847,068 A | | 12/1998 | Maxein et al. |
| 5,886,242 A | | 3/1999 | Etzbach et al. |
| 5,958,293 A | | 9/1999 | Gibbons et al. |
| 5,958,305 A | * | 9/1999 | Shiro et al. ................. 252/585 |

(Continued)

FOREIGN PATENT DOCUMENTS

| | | |
|---|---|---|
| EP | 0 834 754 | 3/1997 |
| EP | 0 881 509 | 5/1998 |
| EP | 0 906 745 | 10/1998 |
| EP | 1 072 649 A1 | 1/2001 |
| EP | 1 088 846 A1 | 4/2001 |

(Continued)

OTHER PUBLICATIONS

English translation of Nakada done by computer on Jun. 15, 2004.*

(Continued)

*Primary Examiner*—Mark F. Huff
*Assistant Examiner*—Jennifer R. Sadula
(74) *Attorney, Agent, or Firm*—Anna A. Kobilansky

(57) ABSTRACT

The invention provides methods of forming a cholesteric liquid crystal layer that include forming a cholesteric liquid crystal composition, depositing the cholesteric liquid crystal composition onto a substrate, and initially drying the cholesteric liquid crystal composition at a temperature at or below about 90° C. so that the cholesteric liquid crystal composition has at least 80% solids remaining. The invention also provides methods of forming a cholesteric liquid crystal layer that include forming a cholesteric liquid crystal composition, depositing the cholesteric liquid crystal composition onto a substrate, and initially drying the cholesteric liquid crystal composition at a temperature at or below about 90° C., wherein the drying is accomplished using a technique that provides little or no airflow. The invention further provides a cholesteric liquid crystal composition that includes at least one cholesteric liquid crystal precursor and 1,3-dioxolane.

15 Claims, 3 Drawing Sheets

U.S. PATENT DOCUMENTS

| | | | | |
|---|---|---|---|---|
| 5,969,055 | A | * 10/1999 | Nishikawa et al. | ......... 525/419 |
| 5,989,461 | A | 11/1999 | Coates et al. | |
| 5,994,212 | A | 11/1999 | Arakawa et al. | |
| 6,001,277 | A | 12/1999 | Ichimura et al. | |
| 6,060,042 | A | 5/2000 | Schuhmacher et al. | |
| 6,071,438 | A | 6/2000 | Hanelt et al. | |
| 6,106,743 | A | 8/2000 | Fan | |
| 6,134,808 | A | 10/2000 | Yapel et al. | |
| 6,153,722 | A | 11/2000 | Schoenfeld et al. | |
| 6,159,654 | A | * 12/2000 | Machida et al. | ......... 430/270.1 |
| 6,181,395 | B1 | 1/2001 | Li et al. | |
| 6,309,561 | B1 | 10/2001 | Hasegawa et al. | |
| 6,312,769 | B1 | * 11/2001 | Hiraoka et al. | .............. 428/1.1 |
| 6,316,170 | B2 | * 11/2001 | Kawamonzen et al. | ..... 430/330 |
| 6,395,354 | B1 | 5/2002 | Sahouani et al. | |
| 6,473,143 | B2 | 10/2002 | Li et al. | |
| 6,620,342 | B1 | * 9/2003 | Burchill et al. | ............. 252/511 |
| 2002/0006479 | A1 | 1/2002 | Sekine et al. | |
| 2002/0113937 | A1 | 8/2002 | Ouderkirk et al. | |
| 2002/0159019 | A1 | 10/2002 | Pokorny et al. | |
| 2002/0180912 | A1 | 12/2002 | Pao-Ju et al. | |
| 2003/0063245 | A1 | 4/2003 | Bowley et al. | |
| 2003/0072893 | A1 | 4/2003 | Nakano et al. | |

FOREIGN PATENT DOCUMENTS

| | | | | |
|---|---|---|---|---|
| GB | 2 357 291 A | | 6/2001 | |
| JP | 08-166603 | * | 6/1996 | ........... G02F/1/137 |
| JP | H 9-133810 | | 5/1997 | |
| JP | H 9-304770 | | 11/1997 | |
| JP | H 10-54909 | | 2/1998 | |
| JP | H 10-142407 | | 5/1998 | |
| JP | 2001-213919 A | | 8/2001 | |
| JP | 2001-316668 A | | 11/2001 | |
| JP | 2001-318225 A | | 11/2001 | |
| JP | 2001-354733 A | | 12/2001 | |
| JP | 2001-354734 A | | 12/2001 | |
| WO | WO 97/35219 | | 2/1997 | |

OTHER PUBLICATIONS

"Cholesteric Structure–I Optical Properties", J.L. Fergason, *Molecular Crystals*, Gordon and Breach Science Publishers, 1966, vol. 1, pp. 293–307.

"Cholesteric Structure–II Optical Properties", J.L. Fergason, N.N Goldberg and R.J. Nadalin, *Molecular Crystals*, Gordon and Breach Science Publishers, 1966, vol. 1, pp. 309–323.

"A Broadband Circularly Polarized Film (CPF)", J.–S. Luh et al. *IDW*, pp. 529–532 (2002).

* cited by examiner

CHOLESTERIC LIQUID CRYSTAL DRYING PROCESS AND SOLVENT

FIELD OF THE INVENTION

The invention generally relates to cholesteric liquid crystal compositions for use in optical bodies such as reflective polarizers, and particularly relates to solvents for use in those compositions and methods of drying the composition to form the optical body

BACKGROUND OF THE INVENTION

Optical devices, such as polarizers and mirrors, are useful in a variety of applications including liquid crystal displays (LCD's). Liquid crystal displays fall broadly into two categories: backlit (e.g., transmissive) displays, where light is provided from behind the display panel, and frontlit (e.g., reflective) displays, where light is provided from the front of the display (e.g., ambient light). These two display modes can be combined to form transflective displays that can be backlit, for example, under dim light conditions or read under bright ambient light.

Conventional backlit LCDs typically use absorbing polarizers and can have less than 10% light transmission. Conventional reflective LCDs are also based on absorbing polarizers and typically have less than 25% reflectivity. The low transmission or reflectance of these displays reduces display brightness and can require high power consumption.

Reflective polarizers have been developed for use in these displays as well as other applications. Reflective polarizers preferentially reflect light having one polarization and transmit light of the opposite or orthoganol polarization. The reflected light has the ability to be recycled, making it possible to have a higher percentage of the light converted to polarized light and consequently a higher transmission of light. It is preferred that reflective polarizers transmit and reflect light without absorbing relatively large amounts of the light. Preferably, the reflective polarizer has no more than 10% absorption for the transmission polarization over the desired range of wavelengths. Most LCD's operate over a broad range of wavelengths and, as a consequence, the reflective polarizer must typically operate over that broad wavelength range, as well.

The invention provides compositions and methods of making optical bodies for use in these and other applications.

SUMMARY OF THE INVENTION

One embodiment of the invention provides a method of forming a cholesteric liquid crystal layer that includes forming a cholesteric liquid crystal composition, depositing the cholesteric liquid crystal composition onto a substrate, and initially drying the cholesteric liquid crystal composition at a temperature at or below 90° C. so that the cholesteric liquid crystal composition has at least 80% solids remaining. In another embodiment, the initial drying takes place at or below 60° C. In a further embodiment, the initial drying occurs at or below 30° C.

Another embodiment of the invention provides a method of forming a cholesteric liquid crystal composition, depositing the cholesteric liquid crystal composition onto a substrate, and initially drying the cholesteric liquid crystal composition at a temperature at or below about 90° C., wherein initial drying is accomplished under conditions which provide little or no airflow at the surface of the cholesteric liquid crystal composition.

A further embodiment of the invention provides a composition that includes at least one cholesteric liquid crystal precursor, and 1,3-dioxolane. Another embodiment of the invention includes at least one cholesteric liquid crystal precursor, 1,3-dioxolane, and at least one other solvent.

BRIEF DESCRIPTION OF THE DRAWINGS

The invention may be more fully understood in consideration of the following detailed description of various embodiments of the invention in connection with the accompanying drawings in which.

Figure 1:
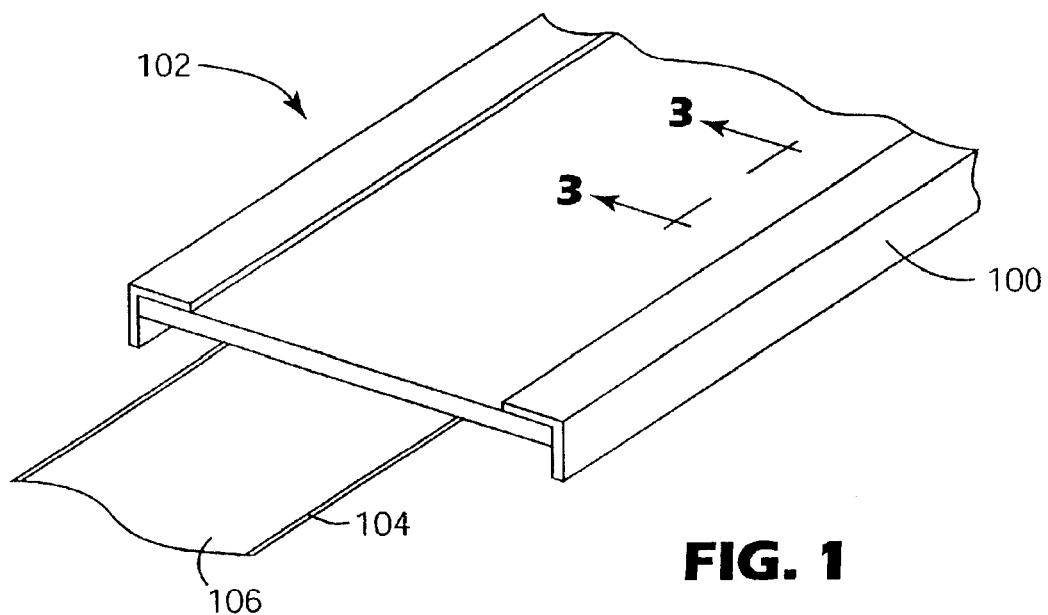
FIG. 1 is a perspective view of an exemplary drying apparatus that can be used in one embodiment of a method of the invention.

While the invention is amenable to various modifications and alternative forms, specifics thereof have been shown by way of example in the drawings and will be described in detail. It should be understood, however, that the intention is not to limit the invention to the particular embodiments described herein. On the contrary, the intention is to cover all modifications, equivalents, and alternatives falling within the spirit and scope of the invention.

DETAILED DESCRIPTION OF THE PREFERRED EMBODIMENT

Cholesteric liquid crystal compositions in accordance with the invention generally include a cholesteric liquid crystal material and at least one solvent. A cholesteric liquid crystal composition may also contain compounds that function as initiators, terminators, curing agents, crosslinkers, antiozonants, antioxidants, plasticizers, inhibitors, stabilizers, and ultraviolet, infrared, or visible light-absorbing dyes and pigments.

The cholesteric liquid crystal material generally includes chiral molecules or moieties, or a mixture of chiral and achiral molecules and can be monomers, polymers or oligomers. The cholesteric liquid crystal material can include one or more cholesteric liquid crystal compounds (including cholesteric liquid crystal polymers), one or more cholesteric liquid crystal precursors (which can be used to form cholesteric liquid crystal compounds), or combinations thereof. Cholesteric liquid crystal compounds generally include at least one molecular unit that is chiral in nature (i.e., does not possess a plane of symmetry) and at least one molecular unit that is mesogenic in nature (i.e, exhibits a liquid crystal phase). Cholesteric liquid crystal compounds are also referred to as chiral nematic liquid crystal compounds. Cholesteric liquid crystal compounds can form a cholesteric liquid crystal phase in which the molecular and optical director (i.e., the unit vector in the direction of average local molecular alignment) of the liquid crystal rotates in a helical fashion along the dimension (the helical axis) perpendicular to the director.

The pitch of a cholesteric liquid crystal layer is the distance (in a direction perpendicular to the director) that it takes for the director or mesogen to rotate through 360°. This distance is generally 250 to 600 nm or more. The pitch of a cholesteric liquid crystal layer can typically be altered by mixing or otherwise combining (e.g., by copolymerization) in various proportions, at least one chiral compound (e.g., a cholesteric liquid crystal compound) with another compound, typically a nematic liquid crystal compound. In such a case, the pitch depends on the relative ratios, by molarity or weight, of the chiral compound in the cholesteric liquid crystal composition. The pitch is generally selected to be on the order of the wavelength of light of interest. The helical twist of the director results in a spatially periodic variation in the dielectric tensor, which in turn gives rise to the wavelength selective reflection of light. For example, the pitch can be selected such that the selective reflection occurs in the visible, ultraviolet, or infrared wavelengths of light or any combination thereof.

Cholesteric liquid crystal compounds and precursors, including cholesteric liquid crystal polymers, are generally known and any cholesteric liquid crystal compound or precursor known to those of skill in the art can be used in the invention. Examples of suitable cholesteric liquid crystal compounds and precursors are described in U.S. Pat. Nos. 4,293,435, 5,332,522, 5,886,242, 5,847,068, 5,780,629, 5,744,057, and 6,309,561, all of which are incorporated herein by reference. However, other cholesteric liquid crystal compounds and precursors not disclosed therein can also be utilized in the invention.

Generally, a cholesteric liquid crystal compound or precursor is selected, at least in part, based on the particular application or optical body that it is ultimately to be used in. Examples of characteristics that can be considered in the choice of cholesteric liquid crystal compounds or precursors include but are not limited to: refractive indices, pitch, processability, clarity, color, low absorption in the wavelength region of interest, compatibility with other components (e.g., a nematic liquid crystal compound), ease of manufacture, availability of the cholesteric liquid crystal compound, precursor, or monomers to form the cholesteric liquid crystal polymer, rheology, method and requirements of curing, ease of solvent removal, physical and chemical properties (e.g., flexibility, tensile strength, solvent resistance, scratch resistance, and phase transition temperature), and ease of purification.

Cholesteric liquid crystal compounds that are cholesteric liquid crystal polymers are typically formed using chiral molecules or a mixture of chiral and achiral molecules (including monomers) that include a mesogenic group. A mesogenic group is generally a rigid rodlike or disclike molecule or portion of a molecule that are components of liquid crystals. Examples of mesogenic groups include, but are not limited to, para-substituted cyclic groups, such as para-substituted benzene rings. These mesogenic groups are optionally bonded to a polymer backbone through a spacer. The spacer can contain functional groups having, for example, benzene, pyridine, pyrimidine, alkyne, ester, alkylene, alkane, ether, thioether, thioester, and amide functionalities.

Suitable cholesteric liquid crystal polymers include, but are not limited to, polymers having a chiral or achiral polyester, polycarbonate, polyamide, polyacrylate, polymethacrylate, polysiloxane, or polyesterimide backbone that include mesogenic groups optionally separated by rigid or flexible comonomers. Examples of other suitable cholesteric liquid crystal polymers have a polymer backbone (for example, a polyacrylate, polymethacrylate, polysiloxane, polyolefin, or polymalonate backbone) with chiral and achiral mesogenic side-chain groups. The side-chain groups can be optionally separated from the backbone by a spacer, such as an alkylene or alkylene oxide spacer, to provide flexibility.

Cholesteric liquid crystal compositions in accordance with the invention also include at least one solvent. Cholesteric liquid crystal compositions containing a mixture of one or more solvents are also in accordance with the invention. In some instances, one or more of the cholesteric liquid crystal compounds, cholesteric liquid crystal precursors, or processing additives can also act as a solvent. The one or more solvents, or other compounds that function as a solvent in compositions of the invention, are generally substantially eliminated from the composition during processing. They can be eliminated by, for example, drying the composition to evaporate the solvent or reacting a portion of the solvent (e.g., reacting a solvating liquid crystal monomer to form a liquid crystal polymer).

In one embodiment of the invention cholesteric liquid crystal compositions include 1,3-dioxolane. In compositions such as these, the 1,3-dioxolane functions as a solvent. 1,3-dioxolane, CAS number 646-06-0, has a boiling point of 75.6° C. at 760 mm Hg, and has a vapor pressure of 82 mm Hg at 20° C. 1,3-dioxolane has a number of synonyms including 1,3-dioxacyclopentane, 1,3-dioxolan, dioxolane, formal glycol, glycolformal, and glycol methylene ether. The chemical structure is given below.

1,3-Dioxolane 1,3-dioxolane is a cyclic reaction product of ethylene glycol and formaldehyde, and can exhibit behavior typical of ethers or acetals depending on the conditions. 1,3-dioxolane is useful as a solvent in cholesteric liquid crystal compositions of the invention in part because of its ability to solubilize the cholesteric liquid crystal compounds or precursors that are used in cholesteric liquid crystal compositions of the invention. Many cholesteric liquid crystal precursors, such as liquid crystal monomers have extended aromatic ring structures, which can have very poor solubility in common organic solvents.

A cholesteric liquid crystal composition in accordance with the invention may also include other solvents or compounds that act as solvents. In one embodiment of the invention, two different solvents are used in a cholesteric liquid crystal composition. In such embodiments, one solvent may be chosen based on its ability to solubilize some of the other constituents of the cholesteric liquid crystal composition, and the other solvent may be used to affect the drying characteristics and processing of the cholesteric liquid crystal composition. In another embodiment, more than two solvents may be used.

In one embodiment of the invention a cholesteric liquid crystal composition of the invention includes 1,3-dioxolane and a second solvent. In one embodiment of the invention, the second solvent has a lower evaporation rate than 1,3-dioxolane. A second solvent with a lower evaporation rate can be used in combination with the 1,3-dioxolane to slow the rate of drying. Examples of solvents that can be used as the second solvent include tetrahydrofuran, 2-methyltetrahydrofuran, tetrahydropyran, dimethylcarbonate, ethylene glycol dimethyl ether, cyclopropanone, methyl ethyl ketone, cyclohexanone, and combinations thereof. In another embodiment of the invention, a cholesteric liquid crystal composition of the invention includes 1,3-dioxolane and cyclohexanone, cyclopropanone, methyl ethyl ketone, or a combination thereof.

In embodiments of the invention that include 1,3-dioxolane as well as a second solvent, such as cyclohexanone, there is generally not more of the second solvent (by weight) than there is of the 1,3-dioxolane. In one embodiment of the invention, the amount of cyclohexanone (or other second solvent) is less than about 50% of the total amount (by weight) of 1,3-dioxolane and second solvent. In another embodiment of the invention, the amount of cyclohexanone (or other second solvent) is less than about 25% of the total amount (by weight) of 1,3-dioxolane and second solvent. In yet another embodiment, the amount of cyclohexanone (or other second solvent) is less than about 15% of the total amount (by weight) of 1,3-dioxolane and second solvent.

The amount of second solvent that is used is generally determined based at least in part on the time that it takes to evaporate from the cholesteric liquid crystal composition under the processing conditions used. In one specific example, where cyclohexanone is utilized, a desired amount of cyclohexanone can be determined from performance data with the desired amount of cyclohexanone giving an advantageous contrast ratio or alignment. The amount of the second solvent that is used can more generally be based on a compromise between the drying time and the annealing time.

Cholesteric liquid crystal compositions in accordance with the invention can also include polymerization initiators that function to initiate polymerization or crosslinking of monomeric or other lower molecular weight compounds of the composition. Suitable polymerization initiators include compounds that can generate free radicals to initiate and propagate polymerization or crosslinking. Free radical initiators can be chosen based on a number of factors, including but not limited to, stability or half-life. Preferably, the free radical initiator does not generate any additional color in the cholesteric liquid crystal layer by absorption or otherwise.

Free radical initiators are typically either thermal free radical initiators or photoinitiators. Thermal free radical initiators, which generate free radicals upon thermal decomposition, include, for example, peroxides, persulfates, or azonitrile compounds. Photoinitiators can be activated by electromagnetic radiation or particle irradiation. Examples of suitable photoinitiators include, but are not limited to, onium salt photoinitiators, organometallic photoinitiators, cationic metal salt photoinitiators, photodecomposable organosilanes, latent sulphonic acids, phosphine oxides, cyclohexyl phenyl ketones, amine substituted acetophenones, and benzophenones. Generally, ultraviolet (UV) irradiation is used to activate the photoinitiator, although other light sources or irradiation (e-beam) can be used. Photoinitiators can be chosen based on the absorption of particular wavelength of light.

Cholesteric liquid crystal compositions in accordance with the invention may also additionally contain compounds that function as dispersing agents, terminators, curing agents, crosslinkers, antiozonants, antioxidants, plasticizers, stabilizers, viscosity modifiers, such as thickeners and fillers, coalescing agents, which function to improve the intimacy of the contact between particles after deposition onto the substrate, and dyes and pigments for absorbing ultraviolet, infrared, or visible light.

Any method known to those of skill in the art for forming a cholesteric liquid crystal composition of the invention into a cholesteric liquid crystal layer can be utilized. Furthermore, improvements in and changes to existing methods of forming cholesteric liquid crystal layers can also be utilized to form cholesteric liquid crystal layers from the cholesteric liquid crystal compositions of the invention. The methods discussed below offer examples of methods and techniques that may be utilized to form cholesteric liquid crystal layers in accordance with the invention.

One method of forming a cholesteric liquid crystal layer includes applying a cholesteric liquid crystal composition to a surface of a substrate. The cholesteric liquid crystal composition can be applied to the surface in a number of ways, including, but not limited to coating and spraying. Alternatively, the surface of the substrate can be oriented prior to being coated with the cholesteric liquid crystal layer. The substrate can be oriented using, for example, drawing techniques, rubbing with a rayon or other cloth, or lyotropic alignment (U.S. Pat. No. 6,395,354, incorporated herein by reference). Photoalignment substrates are described in U.S. Pat. Nos. 4,974,941, 5,032,009, 5,389,698, 5,602,661, 5,838,407, and 5,958,293, all of which are incorporated herein by reference.

After coating, the cholesteric liquid crystal composition is converted into a liquid crystal layer. Generally, this process includes drying the composition and annealing the dried composition, alternatively, drying and annealing can occur somewhat simultaneously. The formation of a cholesteric liquid crystal layer can be accomplished by a variety of techniques including evaporation of the solvent; crosslinking the cholesteric liquid crystal composition; annealing or curing (e.g., polymerizing) the cholesteric liquid crystal composition using, for example, heat, radiation (e.g., actinic radiation), light (e.g., ultraviolet, visible, or infrared light), an electron beam, or a combination of these or similar techniques.

One example of a process of forming a liquid crystal layer includes depositing the cholesteric liquid crystal composition on an oriented substrate. After deposition, the cholesteric liquid crystal composition is heated above the glass transition temperature of the composition to the liquid crystal phase. The composition is then cooled below the glass transition temperature and the composition remains in the liquid crystal phase.

Another process for forming a liquid crystal layer includes depositing the cholesteric liquid crystal composition on a substrate that offers a liquid crystal alignment surface, and aligning the oligomeric liquid crystal by drying and annealing the composition to remove the solvent.

Yet another process for forming a cholesteric liquid crystal layer includes initially drying the cholesteric liquid crystal composition at a decreased temperature. As used herein, "initial drying" of a cholesteric liquid crystal composition is drying until either the percent solids (% solids) remaining or the percent residual solvent (% residual solvent) remaining is at a certain level. Percent solids and percent residual solvent can be calculated as given below.

% solids=weight of solid/(weight of solvent+weight of solids)*100

% residual solvent=(10,000/% solids)−100 or

% residual solvent=(weight of solvent/weight of solid)*100.

In one embodiment of the invention, an initially dried cholesteric liquid crystal composition is one with percent solids remaining of at least about 80%, or percent residual solvent of no more than about 25%. In another embodiment of the invention, an initially dried cholesteric liquid crystal composition is one with percent solids remaining of at least about 90%, or percent residual solvent of no more than about 11%

In one embodiment of the invention, the cholesteric liquid crystal composition is initially dried at a temperature at or below about 90° C. In another embodiment of the invention, the cholesteric liquid crystal composition is initially dried at a temperature at or below about 60° C. In yet another embodiment of the invention, the cholesteric liquid crystal composition is initially dried at a temperature at or below about 30° C.

Initially drying the cholesteric liquid crystal composition at temperatures at or below 90° C. can, but need not, result in desired effects on the cholesteric liquid crystal film formed thereby. It is thought that initially drying the cholesteric liquid crystal composition at temperatures at or below 90° C. increases the rate at which the liquid crystal polymers or monomers align as well as decreases the rate at which the solvent evaporates. Initial drying at temperatures at or below 90° C. is thought to decrease disruptions in the coating that can occur during the evaporation process when the viscosity of the coating is low. Such disruptions are undesired because it takes additional time during annealing to fix the damage that these disruptions cause. Therefore, if the disruptions do not occur, the effective annealing time is reduced because time is not required to repair such damage. When the coating reaches a higher viscosity, these disruptions are less likely to occur, therefore, the initial drying at or below 90° C. is enough to cause such desired effects.

Generally, the lower the temperature of drying, the more likely the desired effects are to occur in the cholesteric liquid crystal layer. Also, the lower the drying temperature, the longer it can take to dry the cholesteric liquid crystal layer. Depending on the solvent or solvents used, as the drying temperature is decreased, the layer may not dry at all, or take an inordinate amount of time to dry. Therefore, in one embodiment of the invention, the initial drying temperature utilized is a result of a compromise between desirous positive effects of low temperature initial drying and the time it takes to dry the layer at the low temperature.

Another method of drying the cholesteric liquid crystal composition includes use of reduced airflow drying techniques. More specifically, the drying techniques include drying the cholesteric liquid crystal composition under conditions which provide little or no airflow at the surface of the cholesteric liquid crystal composition coating. In one embodiment, these conditions may provide improved control of the boundary layer effects and phase change conditions near the gas/liquid interface of the cholesteric liquid crystal composition coating during drying.

Methods of drying under conditions that provide little or no airflow include those found in U.S. Pat. Nos. 5,581,905, 5,694,701, and 6,134,808, all or which are incorporated herein by reference. Furthermore, advances in these and similar drying techniques that provide little or no airflow are also envisioned as being able to be utilized in methods of the invention.

In one embodiment of the invention, an apparatus including a condensing area is used to dry the cholesteric liquid crystal composition. Such an apparatus generally creates a small, controlled environment gap above the surface of the coating. The apparatus accomplishes removal of the solvent from the cholesteric liquid crystal composition without utilizing applied gas convection which is commonly used in most drying methods. Drying without applied gas convection is thought to reduce defects that can be caused by the airflow associated with convection heating. It is thought that if such defects are not formed, the cholesteric liquid crystal composition can anneal faster because the defects don't have to be reordered.

An example of an apparatus that can be utilized for drying the cholesteric liquid crystal composition under conditions which provide little or no airflow at the surface of the cholesteric liquid crystal composition coating is seen in FIG. 1. The apparatus 100 functions to evaporate the solvent from the cholesteric liquid crystal coating 106 and collect it on the condensation area 102. The cholesteric liquid crystal coating 106 is generally coated on a substrate 104. Substrate 104 can be positioned on a web (not shown in FIG. 1), but need not be.

The condensation area 102 and the cholesteric liquid crystal coating 106 are generally moving relative to each other. This can be accomplished by any configuration that allows such relative movement. For example, the cholesteric liquid crystal coating 106 and its substrate 104 can be in motion, the condensation area 102 can be in motion, or some combination thereof.

The condensation area 102 can also be at a lower temperature than the cholesteric liquid crystal coating 106 and the substrate 104. This relative temperature difference can cause the solvent in the cholesteric liquid crystal composition to evaporate from the composition and condense on the condensation area 102.

Figure 2:
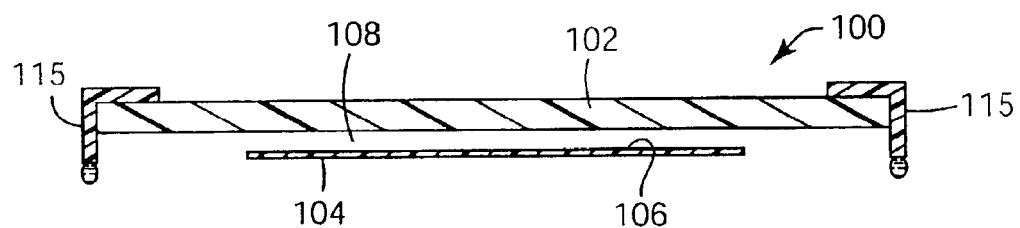
FIG. 2 is a cross-sectional view of the drying apparatus of FIG. 1.

As seen in FIG. 2, the condensation area 102 is placed above, but near the cholesteric liquid crystal composition 106. The arrangement of the condensation area 102 and the cholesteric liquid crystal composition 106 creates a small, substantially planar gap 108 above the cholesteric liquid crystal composition 106. In one embodiment, the gap 108 covers a distance of about 20 centimeters (cm) or less. In another embodiment, the gap 108 is about 10 cm or less, and in yet another embodiment, the gap 110 is about 5 cm or less.

The controlled environment created by the gap 108 provides little or no airflow at the surface of the cholesteric liquid crystal composition 106. Little or no airflow is thought to aid in annealing the cholesteric liquid crystal composition which leads to a better aligned cholesteric liquid crystal film, creates a similarly aligned cholesteric liquid crystal film in a shortened time period, or some combination thereof.

Figure 3:
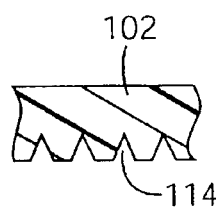
FIG. 3 is a cross-sectional view taken along line 3—3 of FIG. 1.

As the solvent evaporates from the cholesteric liquid crystal composition 106, it travels across the gap 108, condenses on the condensation area 102 and is collected or removed from the condensation area 102 in some fashion. FIG. 3 illustrates one method for collection or removal of the solvent from the condensation area 102. In this example, condensation area 102 can have transverse open channels or grooves 114 which utilize capillary action to move the condensed solvent laterally to edge plates 115 (seen in FIG. 2). The solvent can then be collected as it drips down edge plates 115.

Figure 4:
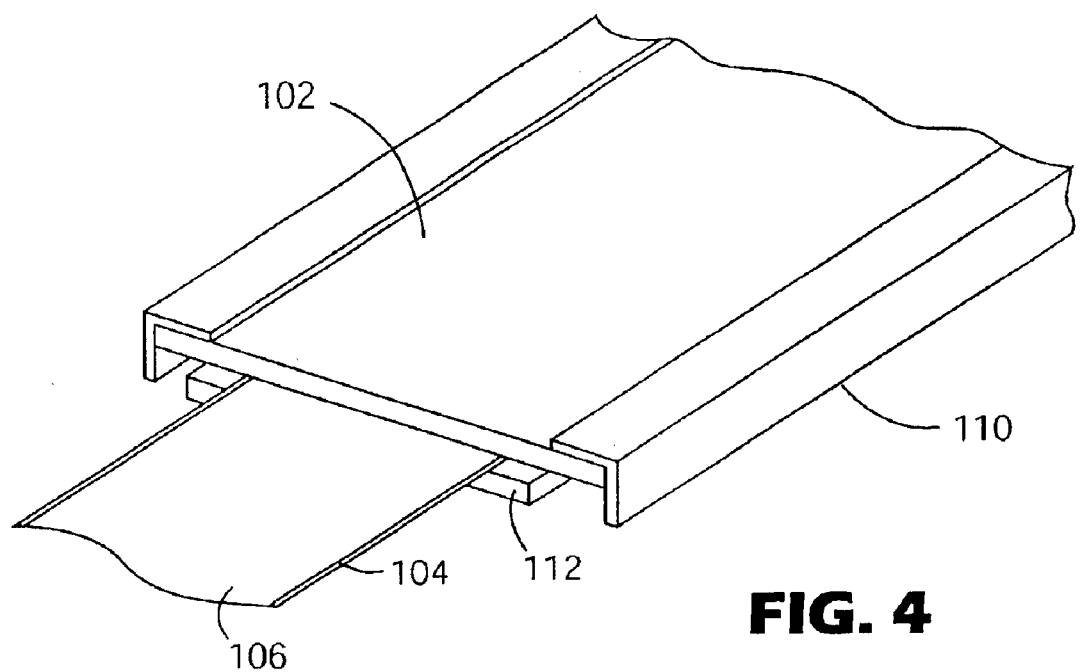
FIG. 4 is a perspective view of another exemplary drying apparatus that can be used in one embodiment of a method of the invention.
Figure 5:
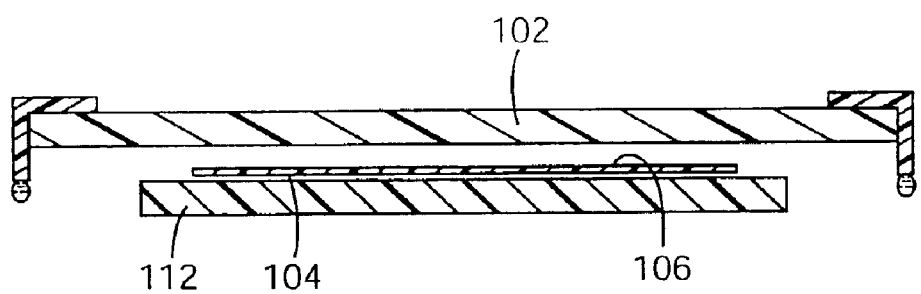
FIG. 5 is a cross-sectional view of the drying apparatus of FIG. 4.

FIGS. 4 and 5 illustrate another example of an apparatus for use in a drying step of the invention. This apparatus 110 includes the same components as that discussed above with respect to FIGS. 1 and 2 but also contains a heating area 112. The heating area 112 is located on the non-coated side of the substrate 104. The heating area 112 transfers heat through the substrate 104 (and any underlying structures that may be under the substrate 104) to aid in evaporating the solvent from the cholesteric liquid crystal composition 106.

Figure 6:
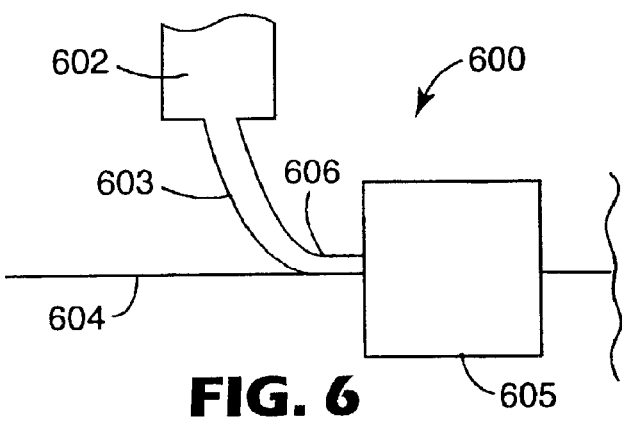
FIG. 6 is a schematic illustration of yet another exemplary drying apparatus that can be used in one embodiment of a method of the invention.

In another embodiment of the invention, a shroud can be used as a drying technique that provides little or no airflow. An example of a shroud can be seen in FIG. 6. FIG. 6 illustrates a portion 600 of a processing system for forming a cholesteric liquid crystal film from a cholesteric liquid crystal composition. In FIG. 6, the cholesteric liquid crystal composition is initially contained in a container 602, which feeds the coater 603. The coater 603 forms the coating 606 of the cholesteric liquid crystal composition on a substrate 604. After the coating 606 is deposited on the substrate 604, the substrate 604, which is part of a moving system, transports the coating 606 into the shroud 605. After the coating 606 goes through the shroud 605, other processing steps can be carried out. Examples of such other steps include but are not limited to heating in an oven, irradiation, and other treatments.

The shroud 605 is generally placed in the processing system after the coater 603 forms the coating 606. In one embodiment of the invention, the shroud 605 is placed directly after the coating 606 is applied to the substrate 604. The shroud 605 can generally be described as a structure that is placed above, below, and/or on the sides of the surface of the substrate 604 that transports the coating 606. In one embodiment, the shroud 605 includes structures surrounding all surfaces of the substrate 604 and coating 606. The shroud 605 generally does not contain any thermal elements, and does not actively control the temperature within the volume of the shroud.

The shroud 605 functions to provide little or no airflow around the coating 606. The amount of airflow around the coating 606 can be controlled, at least in part, by the distance that the shroud 605 is from the coating 606, the bottom surface of the substrate 604, or both. In one embodiment, the interior surfaces of the shroud 605 are about 20 cm or less away from the coating 606, bottom surface of the substrate 604, or both. In another embodiment, the distance is about 10 cm or less, and in yet another embodiment about 5 cm or less. In yet another embodiment, the interior surfaces of the shroud 605 are as close as possible to the coating 606, bottom surface of the substrate 604, or both without obstructing the functioning of the processing system or interfering with the coating 606.

After a cholesteric liquid crystal composition has been dried in accordance with the invention, any further processing steps that are generally used by those of skill in the art can be carried out.

It should be understood by those of skill in the art, having read this specification, that virtually any combination of the use of 1,3-dioxolane alone, the use of 1,3-dioxolane in combination with another solvent, the use of decreased initial drying temperatures alone or the use of drying techniques that provide little or no airflow can be utilized.

Cholesteric liquid crystal compositions can be formed into a cholesteric liquid crystal layer that substantially reflects light having one circular polarization (e.g., left or right circularly polarized light) and substantially transmits light having the other circular polarization (e.g., right or left circularly polarized light) over a particular bandwidth of light wavelengths. This characterization describes the reflection or transmission of light directed at normal incidence to the director of the cholesteric liquid crystal material. Light that is directed at other angles will typically be elliptically polarized by the cholesteric liquid crystal material and the Bragg reflection peak is typically blue-shifted from its on-axis wavelength. Cholesteric liquid crystal materials are generally characterized with respect to normally incident light, as done below, however, it will be recognized that the response of these materials can be determined for non-normally incident light using known techniques.

The cholesteric liquid crystal layer can be used alone or in combination with other layers or devices to form an optical body, such as, for example, a reflective polarizer. Cholesteric liquid crystal polarizers are used in one type of reflective polarizer. The pitch of a cholesteric liquid crystal polarizer is similar to the optical layer thickness of multilayer reflective polarizers. Pitch and optical layer thickness determine the center wavelength of the cholesteric liquid crystal polarizers and multilayer reflective polarizers, respectively. The rotating director of the cholesteric liquid crystal polarizer forms optical repeat units similar to the use of multiple layers having the same optical layer thickness in multilayer reflective polarizers.

The center wavelength, $\lambda_0$, and the spectral bandwidth, $\Delta\lambda$, of the light reflected by the cholesteric liquid crystal layer depend on the pitch, p, of the cholesteric liquid crystal. The center wavelength, $\lambda_0$, is approximated by:

$$\lambda_0 = 0.5(n_o + n_e)p$$

where $n_o$ and $n_e$ are the refractive indices of the cholesteric liquid crystal for light polarized parallel to the director of the liquid crystal ($n_e$) and for light polarized perpendicular to the director of the liquid crystal ($n_o$). The spectral bandwidth, $\Delta\lambda$, is approximated by:

$$\Delta\lambda = 2\lambda_0(n_e - n_o)/(n_e + n_o) = p(n_e - n_o).$$

Cholesteric liquid crystal polarizers can be formed by laminating or otherwise stacking two already-formed cholesteric liquid crystal layers, each disposed on an individual substrate, with different pitches (e.g., layers having different compositions, for example, different ratios by weight of chiral and nematic liquid crystal compounds or monomers). These two layers are heated to diffuse liquid crystal material between the layers. The diffusion of material between the two layers typically results in the pitch of the layers varying over a range between the individual pitches of the two layers. Other methods of forming cholesteric liquid crystal polarizers are described in, for example, U.S. patent application Ser. Nos. 09/790,832; 09/791,157; and 09/957,724, all of which are incorporated herein by reference.

Figure 7:
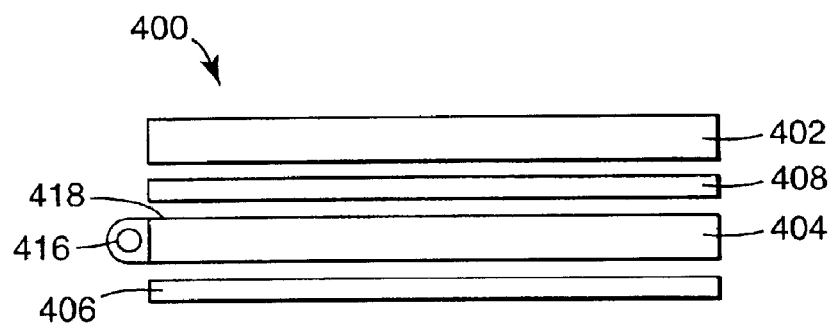
FIG. 7 is a schematic illustration of one embodiment of a liquid crystal display in accordance with the invention.

The cholesteric liquid crystal optical bodies can be used in a variety of optical displays and other applications, including transmissive (e.g., backlit), reflective, and transflective displays. For example, FIG. 7 illustrates a schematic cross-sectional view of one illustrative backlit display system 400 including a display medium 402, a backlight 404, a cholesteric liquid crystal reflective polarizer 408, as described above, and an optional reflector 406. The display system optionally includes a wave plate as part of the cholesteric liquid crystal reflective polarizer or as a separate component to convert the circularly polarized light from the liquid crystal reflective polarizer to linearly polarized light. A viewer is located on the side of the display device 402 that is opposite from the backlight 404.

The display medium 402 displays information or images to the viewer by transmitting light that is emitted from the backlight 404. One example of a display medium 402 is a liquid crystal display (LCD) that transmits only light of one polarization state.

The backlight 404 that supplies the light used to view the display system 400 includes, for example, a light source 416 and a light guide 418, although other backlighting systems can be used. Although the light guide 418 depicted in FIG. 7 has a generally rectangular cross-section, backlights can use light guides with any suitable shape. For example, the light guide 418 can be wedge-shaped, channeled, a pseudo-wedge guide, etc. The primary consideration is that the light guide 418 be capable of receiving light from the light source 416 and emitting that light. As a result, the light 418 can include back reflectors (e.g., optional reflector 406), extraction mechanisms and other components to achieve the desired functions.

The reflective polarizer 408 is an optical film that includes at least one cholesteric liquid crystal optical body, as described above. The reflective polarizer 408 is provided to substantially transmit light of one polarization state exiting the light guide 418 and substantially reflect light of a different polarization state exiting the light guide 418.

Figure 8:
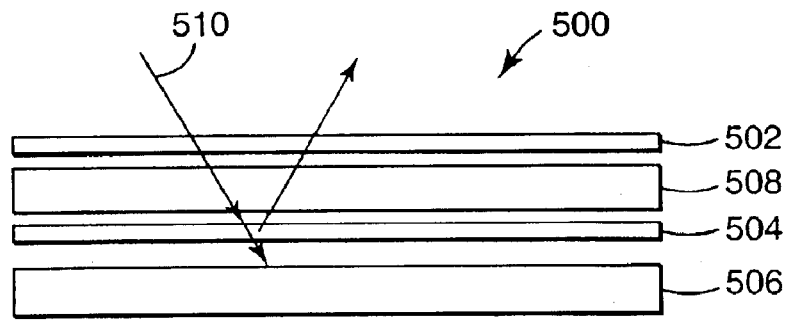
FIG. 8 is a schematic illustration of another embodiment of a liquid crystal display in accordance with the invention.

FIG. 8 is a schematic illustration of one type of reflective liquid crystal display 500. This reflective liquid crystal display 506 includes a display medium 508, a cholesteric liquid crystal reflective polarizing mirror 504, an absorptive backing 506, and an absorptive polarizer 502. The liquid crystal display 500 optionally includes a wave plate as part of the cholesteric liquid crystal reflective polarizer 504 or as a separate component to convert mixed polarization light from the liquid crystal device to an appropriately polarized light.

Liquid crystal display 500 functions first by the absorptive polarizer 502 polarizing light 510. The polarized light then travels through the display medium 508 where one of the light's circular polarization components reflects from the cholesteric liquid crystal reflective polarizing mirror 504 and passes back through the display medium 508 and absorptive polarizer 502. The other circular polarization component passes through the cholesteric liquid crystal reflective polarizer 504 and is absorbed by the backing 506. The reflective polarizer 504 of this reflective liquid crystal display 500 includes one cholesteric liquid crystal optical body, as described above. The specific choice of cholesteric liquid crystal optical body can depend on factors such as, for example, cost, size, thickness, materials, and wavelength range of interest.

Figure 9:
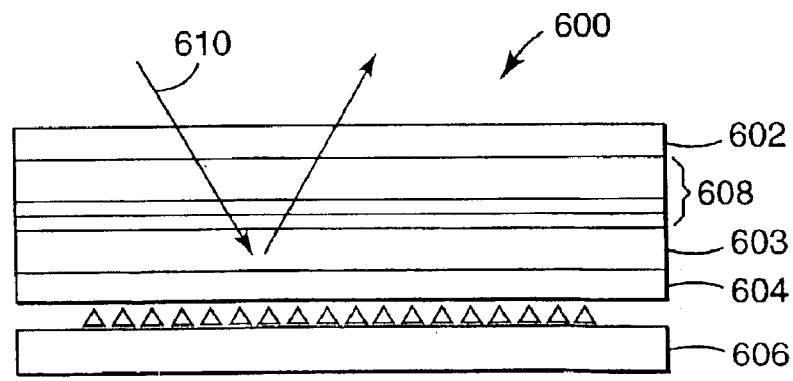
FIG. 9 is a schematic illustration of yet another embodiment of a liquid crystal display in accordance with the invention.

FIG. 9 is a schematic illustration of one type of transflective liquid crystal display 600. This transflective liquid crystal display 600 includes a phase retarding display medium 608, a partial mirror 603, a cholesteric liquid crystal reflective polarizing mirror 604, a backlight 606, and an absorptive polarizer 602. The display system optionally includes a wave plate as part of the cholesteric liquid crystal reflective polarizer 604 or as a separate component to convert mixed polarization light from the liquid crystal device to an appropriately polarized light. In the reflective mode, bright ambient light 610 is polarized by the absorptive polarizer 602, travels through the display medium 608, reflects off the partial mirror 603, and passes back through the display medium 608 and absorptive polarizer 602. In low ambient-light situations, the backlight 606 is activated and light is selectively passed through the cholesteric polarizer 604, matched to provide appropriately polarized light to the display. Light of the opposite handedness is back-reflected, recycled, and selectively passed through the cholesteric polarizer 604 to effectively increase backlight brightness.

The reflective polarizer of this reflective liquid crystal display 600 includes one cholesteric liquid crystal optical body, as described above. The specific choice of cholesteric liquid crystal optical body can depend on factors such as, for example, cost, size, thickness, materials, and wavelength range of interest.

The cholesteric liquid crystal optical body can be used with a variety of other components and films that enhance or provide other properties to a liquid crystal display. Such components and films include, for example, brightness enhancement films, retardation plates including quarter-wave plates and films, multilayer or continuous/disperse phase reflective polarizers, metallized back reflectors, prismatic back reflectors, diffusely reflecting back reflectors, multilayer dielectric back reflectors, and holographic back reflectors.

All chemicals for the following examples can be obtained from Aldrich, Inc. of Milwaukee, Wis. unless indicated otherwise.

EXAMPLE 1

Comparison of the Solubility of Various Monomers in 1,3-dioxolane and other Solvents.

4-(2-Acryloyloxy-ethoxy)-benzoic acid 4'-cyano-biphenyl-4-yl ester is a cholesteric liquid crystal monomer with the structure given below and can be prepared as described in European Patent Application Publication No. 834754, incorporated herein by reference.

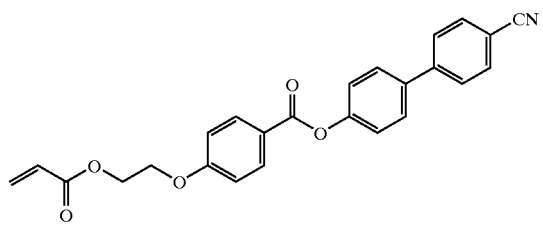

4-(2-Acryloyloxy-ethoxy)-benzoic acid 4'-cyano-biphenyl-4-yl ester was dissolved in hot (boiling) tetrahydrofuran and hot 1,3-dioxolane. Only 20% of the monomer dissolved in the tetrahydrofuran, while 40% dissolved in the 1,3-dioxolane. This shows that cholesteric liquid crystal monomers, of which 4-(2-acryloyloxy-ethoxy)-benzoic acid 4'-cyano-biphenyl-4-yl ester is representative, are more soluble in 1,3-dioxolane than in tetrahydrofuran.

EXAMPLE 2

Addition of Another Solvent to Control Drying Temperature

The ingredients in Table 1 were combined and dissolved to create solution A.

TABLE 1

| Compound | Weight Percent |
| --- | --- |
| Cyano biphenyl benzoate acrylate | 30% |
| Paliocolor LC 756 (BASF, Charlotte, NC) | 2.2% |
| Carbon tetrabromide | 0.25% |
| Vazo 52 (Wilmington, DE) | 0.83% |
| 1,3-dioxolane | 66.7% |

Solution A was purged with nitrogen and heated for approximately 18 hours at approximately 60° C. to initiate polymerization of the acrylates. Solution A was then used to create Solutions B and C as seen in Table 2 below.

TABLE 2

| Component | Weight Percent in Solution B | Weight Percent in Solution C |
| --- | --- | --- |
| Solution A | 50% | 50% |
| 4'-cyano-4-hydroxybiphenyl | 5% | 5% |
| 1,3-dioxolane | 32.5% | 45% |
| Cyclohexanone | 12.5% | 0% |

Solutions B and C were coated (wet coating thickness equal to about 12 to 15 μm) on to a 100 μm polyethylene terepthalate (PET) film to a dried thickness of about 2.5 micrometers (μm). The coated PET films (shown in Table 3) were then dried at either 30° C. or 90° C. for one (1) minute. The average reflection of the coatings from approximately 400 nm to approximately 500 nm was then measured using a Lambda 90° spectrophotometer (Perkin Elmer, Santa Clara, Calif.). The coatings were then annealed for approximately 5 minutes at 120° C. The transmission spectra in the selective reflection region of the coatings were then measured using a Glan-Thomas polarizer oriented at 45 degrees to a ¼ wave film. The selective reflection leads to a lowered transmission in that wavelength region. The polarizer was then oriented to give the minimum transmission (extinction) and the spectra was recorded. The resulting extinction measurements were averaged from about 690 nanometers (nm) to about 580 nm, and can be seen in Table 3 below.

TABLE 3

| Solution | Drying Temperature | Reflection (%) | Extinction (%) |
| --- | --- | --- | --- |
| B | 30° C. | 14.8 | 23.6 |
| B | 90° C. | 38.5 | 27.8 |
| C | 30° C. | 27.4 | 27.2 |
| C | 90° C. | 42.3 | 31.4 |

By comparing similar solutions at different drying temperatures, it can be seen that lower drying temperatures result in a cholesteric liquid crystal film with a lower reflection value after drying. A lower reflection value generally implies that the film is less hazy and has fewer defects, and therefore the liquid crystal should take less time to anneal. A shorter anneal time is a significant advance for processing cholesteric liquid crystal compositions. A shorter anneal time also generally implies that the extinction of the film will be improved (a decreased value), or in other words, the film will be a better polarizer, as seen by the extinction measurements.

The results in Table 3 also shows the difference caused by the addition of a second solvent, in this example cyclohexanone, as part of solution B. By comparing the measurements of solution B with solution C at both 30° C. and 90° C. respectively, it can be seen that the addition of cyclohexanone, which was present in Solution B, also reduces the initial defects (as seen by a lower reflection value). As, was the case in lower drying temperatures, a lower reflection value means that the film is less hazy and has fewer defects, which should lead to a shorter anneal time, and a lower extinction as also seen in Table 3.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A cholesteric liquid crystal composition comprising: at least one chiral nematic liquid crystal material solubilized in 1,3-dioxolane and a second solvent of either cyclohexanone, cyclopropanone, methyl ethyl ketone or a combination thereof wherein there is more 1,3-dioxolane, by weight, than the second solvent.

2. The cholesteric liquid crystal composition of claim 1, wherein the second solvent comprises cyclohexanone and the amount of cyclohexanone is no more than 25% of the amount of the cyclohexanone and 1,3-dioxolane by weight.

3. A method of forming a cholesteric liquid crystal layer comprising;

(a) forming a chiral nematic liquid crystal composition;

(b) depositing the chiral nematic liquid crystal composition onto a substrate; and (c) initially drying the chiral nematic liquid crystal composition at a temperature at or below about 90° C. so that the chiral nematic liquid crystal composition has at least 80% solids remaining.

4. The method of claim 3, wherein said initial drying results in the chiral nematic liquid crystal composition having greater than about 90% solids remaining.

5. The method according to claim 3, wherein said drying is accomplished at a temperature at or below about 60° C.

6. The method according to claim 3, wherein said drying is accomplished at a temperature at or below about 30° C.

7. The method according to claim 3, wherein said drying is accomplished with little or no airflow.

8. The method according to claim 7, wherein said drying step utilizes an apparatus comprising a condensation area.

9. The method according to claim 8, wherein the configuration of said apparatus creates a controlled environment gap between said condensation area and said surface of said cholesteric liquid crystal composition.

10. The method according to claim 9, wherein said controlled environment gap is less than or approximately equal to about 20 cm.

11. The method according to claim 7, wherein said drying is accomplished with the use of a shroud.

12. The method according to claim 11, wherein said shroud is less than about 20 cm from said deposited chiral nematic liquid crystal composition.

13. The method according to claim 3, wherein said chiral nematic liquid crystal composition comprises 1,3-dioxolane as a solvent.

14. The method according to claim 13, wherein said chiral nematic liquid crystal composition further comprises a second solvent.

15. The method according to claim 14, wherein said second solvent comprises cyclohexanone, cyclopropanone, methyl ethyl ketone, or a combination thereof.

* * * * *

UNITED STATES PATENT AND TRADEMARK OFFICE
CERTIFICATE OF CORRECTION

PATENT NO. : 6,913,708 B2
DATED : July 5, 2005
INVENTOR(S) : Solomonson, Steven D.

It is certified that error appears in the above-identified patent and that said Letters Patent is hereby corrected as shown below:

Title page,
Item [56], References Cited, OTHER PUBLICATIONS,
"Cholesteric Structure - II Optical Properties" reference, after "N.N" insert -- . --.

Column 11,
Line 25, delete "506" and insert -- 500 --.

Column 13,
Line 18, delete "90°" and insert -- 900 --.
Line 56, after "As" delete ",".

Column 14,
Line 18, delete ";" and insert -- : --.
Line 42, delete "cholesteric" and insert -- chiral nematic --.

Signed and Sealed this

Fourteenth Day of March, 2006

JON W. DUDAS
*Director of the United States Patent and Trademark Office*